US00RE50027E

(19) United States
(12) Reissued Patent
Lee

(10) Patent Number: US RE50,027 E
(45) Date of Reissued Patent: Jul. 2, 2024

(54) DISPLAY SCREEN WITH ICON

(71) Applicant: Google LLC, Mountain View, CA (US)

(72) Inventor: Sehee Lee, Brooklyn, NY (US)

(73) Assignee: GOOGLE LLC, Mountain View, CA (US)

(21) Appl. No.: 29/725,145

(22) Filed: Feb. 21, 2020

Related U.S. Patent Documents

Reissue of:
(64) Patent No.: Des. 852,845
Issued: Jul. 2, 2019
Appl. No.: 29/643,543
Filed: Apr. 10, 2018

(51) LOC (14) Cl. ..... 14-04
(52) U.S. Cl.
USPC ..... D14/492; D14/490
(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812; H04L 12/581; H04L 12/1813; H04L 51/32
See application file for complete search history.

(56) References Cited

U.S. PATENT DOCUMENTS

| | | | | |
|---|---|---|---|---|
| 5,949,998 | A | 9/1999 | Fowlow et al. | |
| D443,898 | S * | 6/2001 | Maruyama | D20/11 |
| D600,716 | S | 9/2009 | LaManna et al. | |
| D612,394 | S * | 3/2010 | La | D14/488 |
| D636,398 | S * | 4/2011 | Matas | D14/486 |
| D676,375 | S | 2/2013 | Braukmann et al. | |
| D712,421 | S * | 9/2014 | Inose | D14/486 |
| D750,663 | S * | 3/2016 | Mariet | D14/489 |
| D752,608 | S | 3/2016 | Oh et al. | |
| D754,723 | S * | 4/2016 | Xu | D14/488 |
| D758,443 | S * | 6/2016 | Kang | D14/492 |
| D762,242 | S * | 7/2016 | Fujimaki | D14/489 |
| D775,204 | S | 12/2016 | Cho et al. | |
| D784,385 | S * | 4/2017 | Kim | D14/486 |
| D788,169 | S * | 5/2017 | Wessel | D14/492 |
| D791,178 | S * | 7/2017 | Franganillo | D14/489 |
| D800,759 | S | 10/2017 | Perekoty et al. | |
| D800,772 | S | 10/2017 | Woolley | |
| D800,773 | S | 10/2017 | Kim et al. | |
| D808,424 | S * | 1/2018 | Fox | D14/492 |
| D815,124 | S * | 4/2018 | Mariet | D14/486 |

(Continued)

OTHER PUBLICATIONS

"Cars & Journey." iconfinder.com. Mar. 4, 2017. Accessed Feb. 12, 2019. Available online at URL: <https://www.iconfinder.com/iconsets/cars-journey> (Year: 2017).*

(Continued)

*Primary Examiner* — Darlington Ly
(74) *Attorney, Agent, or Firm* — Plumsea Law Group, LLC

(57) CLAIM

The ornamental design for a display screen with icon, as shown and described.

DESCRIPTION

[The sole FIGURE] *FIG. 1* is a front view *of a first embodiment* of a display screen with icon, showing the [embodying my] new design*; and*
*FIG. 2 is a front view of a second embodiment of a display screen with icon, showing the new design.*
The broken lines of uneven length show the display screen and form no part of the claimed design.

1 Claim, 2 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D819,649 | S | * | 6/2018 | Ive | D14/485 |
| D819,695 | S | * | 6/2018 | Rowe | D14/492 |
| D820,312 | S | * | 6/2018 | Rowe | D14/492 |
| D834,065 | S | * | 11/2018 | Takeuchi | D14/492 |
| D842,898 | S | * | 3/2019 | Takeuchi | D14/492 |
| D848,478 | S | | 5/2019 | Woolley | |
| D868,095 | S | * | 11/2019 | Morris | D14/486 |
| D878,417 | S | * | 3/2020 | Lee | D14/492 |
| D881,937 | S | | 4/2020 | Kim | |
| D903,703 | S | * | 12/2020 | Lindberg | D14/486 |
| D905,096 | S | * | 12/2020 | Zimmer | D14/488 |
| D906,365 | S | * | 12/2020 | Farmer | D14/489 |
| D907,654 | S | * | 1/2021 | Henegar | D14/486 |
| 2012/0065909 | A1 | | 3/2012 | Patino et al. | |
| 2013/0060379 | A1 | | 3/2013 | Choe et al. | |
| 2015/0116363 | A1 | | 4/2015 | Monte et al. | |
| 2016/0046199 | A1 | | 2/2016 | Butler et al. | |
| 2017/0083711 | A1 | * | 3/2017 | Hemaraj | G06F 3/167 |

OTHER PUBLICATIONS

"Car and blue tooth Line Icon on Black Background." iconswebsite.com. Mar. 13, 2017. Accessed Feb. 12, 2019. Available online at URL: <http://iconswebsite.com/shutterstock-image/car-and-blue-tooth-line-icon-on-black-background-600027647.html> (Year: 2017).*

* cited by examiner

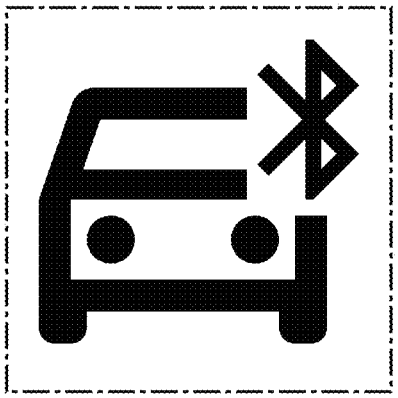
FIG. 1
(Amended)

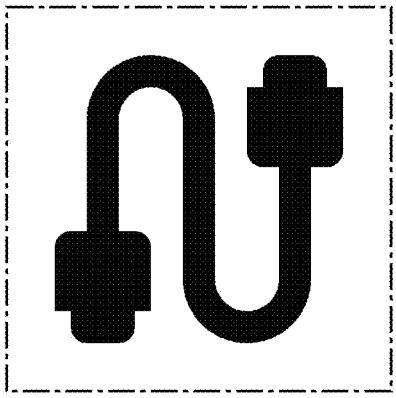
FIG. 2
(New)